(12) United States Patent
King et al.

(10) Patent No.: US 10,793,176 B2
(45) Date of Patent: Oct. 6, 2020

(54) PALLET LIFT

(71) Applicant: Rehrig Pacific Company, Los Angeles, CA (US)

(72) Inventors: Philip A. King, Sugar Hill, GA (US); Jon P. Hassell, Atlanta, GA (US); William P. Apps, Alpharetta, GA (US)

(73) Assignee: Rehrig Pacific Company, Los Angeles, CA (US)

( * ) Notice: Subject to any disclaimer, the term of this patent is extended or adjusted under 35 U.S.C. 154(b) by 82 days.

(21) Appl. No.: 14/594,584

(22) Filed: Jan. 12, 2015

(65) Prior Publication Data

US 2015/0225215 A1    Aug. 13, 2015

Related U.S. Application Data

(60) Provisional application No. 61/926,353, filed on Jan. 12, 2014, provisional application No. 61/950,814, filed on Mar. 10, 2014.

(51) Int. Cl.
| | |
|---|---|
| *B62B 3/06* | (2006.01) |
| *B62B 5/06* | (2006.01) |
| *B66F 5/04* | (2006.01) |
| *B66F 9/12* | (2006.01) |
| *B66F 9/20* | (2006.01) |

(52) U.S. Cl.
CPC .......... *B62B 3/0606* (2013.01); *B62B 3/0625* (2013.01); *B62B 3/0631* (2013.01); *B62B 5/067* (2013.01); *B66F 5/04* (2013.01); *B66F 9/12* (2013.01); *B66F 9/20* (2013.01)

(58) Field of Classification Search
CPC .. B66F 9/065; B66F 9/20; B66F 9/142; B66F 9/06; B66F 9/18; B66F 9/195; B62B 1/14; B62B 1/145

USPC .......................................................... 254/8 R
See application file for complete search history.

(56) References Cited

U.S. PATENT DOCUMENTS

| | | | |
|---|---|---|---|
| 194,236 | A | 8/1877 | Grable |
| 206,746 | A | 8/1878 | Newland |
| (Continued) | | | |

FOREIGN PATENT DOCUMENTS

| | | |
|---|---|---|
| DE | 29619299 U1 | 1/1997 |
| JP | 2006298230 A | 11/2006 |
| WO | 2014067077 A1 | 5/2014 |

OTHER PUBLICATIONS

U.S. Appl. No. 15/639,266, filed Jun. 30, 2017.
U.S. Appl. No. 15/788,967, filed Oct. 20, 2017.
U.S. Appl. No. 15/606,598, filed May 26, 2017.

*Primary Examiner* — Orlando E Aviles
*Assistant Examiner* — Seahee Hong
(74) *Attorney, Agent, or Firm* — Carlson, Gaskey & Olds, P.C.

(57) ABSTRACT

A pallet lift includes a base and a plurality of wheels supporting the base. A pair of contact surfaces are proximate a distal end of the base. A handle projects upward proximate a proximal end of the base. A rear support surface support is on the base between the contact surfaces and the handle. The base may include a pair of spaced apart rails capable of receiving columns of a pallet therebetween. In one embodiment, the base includes a pair of four-bar linkages and the handle is a lift handle configured to selectively collapse and extend the four-bar linkages to raise and lower a pallet.

28 Claims, 15 Drawing Sheets

(56) References Cited

U.S. PATENT DOCUMENTS

| | | | | |
|---|---|---|---|---|
| 1,129,775 | A * | 2/1915 | Anthony | B62B 3/0631 108/54.1 |
| 1,133,411 | A | 3/1915 | Steele | |
| 1,196,995 | A | 9/1916 | Tuttle | |
| 1,329,995 | A * | 2/1920 | Oubridge | B62B 3/06 254/10 C |
| 1,436,665 | A * | 11/1922 | Monro | B62B 1/14 280/47.24 |
| 1,497,085 | A | 6/1924 | Brandt | |
| 1,609,017 | A * | 11/1926 | Firestone | B62B 3/0625 254/10 C |
| 1,818,060 | A * | 8/1931 | Holman | B62B 3/0625 254/10 C |
| 2,028,133 | A * | 1/1936 | Bowers | B62B 3/04 254/3 R |
| 2,121,764 | A | 6/1938 | Quayle | |
| 2,319,581 | A * | 5/1943 | Brownlee | B60B 33/06 15/323 |
| 2,414,277 | A * | 1/1947 | Shepard, Jr. et al. | B62B 3/00 280/47.34 |
| 2,860,852 | A | 11/1958 | Lewis, Jr. | |
| 3,074,691 | A | 1/1963 | Knapp et al. | |
| 3,129,923 | A | 4/1964 | Kikuchi | |
| 3,290,051 | A * | 12/1966 | O'Brien | B62B 3/0625 254/10 R |
| 3,306,579 | A | 2/1967 | Campbell | |
| 3,547,288 | A * | 12/1970 | Butler | B62B 1/14 414/446 |
| 4,102,464 | A * | 7/1978 | Schuster | B66F 9/12 293/107 |
| 4,714,026 | A * | 12/1987 | Yamaguchi | B65D 19/0012 108/57.29 |
| 4,854,422 | A * | 8/1989 | Kawada | B66F 7/0625 180/19.2 |
| 5,378,004 | A * | 1/1995 | Gunlock | B62B 1/002 254/8 B |
| 5,405,236 | A | 4/1995 | Sundstrom et al. | |
| 5,951,234 | A * | 9/1999 | Johansson | B62B 3/0625 188/250 R |
| 6,024,376 | A * | 2/2000 | Golichowski | B62B 3/022 16/35 R |
| 6,186,728 | B1 * | 2/2001 | Michaud | B62B 3/0631 254/10 R |
| 6,425,724 | B1 * | 7/2002 | Williamson | B62B 1/145 280/47.29 |
| 6,729,632 | B2 * | 5/2004 | Ferrigan | B62B 3/02 248/129 |
| 7,114,906 | B1 | 10/2006 | Baumgarner et al. | |
| 7,856,932 | B2 | 12/2010 | Stahl et al. | |
| 7,987,797 | B2 | 8/2011 | Stahl et al. | |
| 7,988,405 | B2 | 8/2011 | Ellington | |
| 8,011,677 | B1 | 9/2011 | Ellington et al. | |
| 8,075,244 | B2 | 12/2011 | Ellington | |
| 8,282,111 | B2 | 10/2012 | Hailston et al. | |
| 8,360,443 | B2 | 1/2013 | Ellington | |
| 8,376,089 | B2 * | 2/2013 | Stone | B66F 9/06 180/19.2 |
| 8,776,697 | B1 | 7/2014 | O'Connell | |
| 8,894,076 | B2 | 11/2014 | Hailston et al. | |
| 8,950,759 | B2 | 2/2015 | Thorsen et al. | |
| 9,260,125 | B2 | 2/2016 | Ellington et al. | |
| 9,403,547 | B2 | 8/2016 | Ellington | |
| 9,611,071 | B2 | 4/2017 | Baltz et al. | |
| 2002/0109345 | A1 * | 8/2002 | Dufty | B62D 63/061 280/789 |
| 2003/0234517 | A1 * | 12/2003 | Sagol | B62B 5/06 280/655.1 |
| 2007/0116548 | A1 * | 5/2007 | Cooper | B62B 3/06 414/619 |
| 2009/0183953 | A1 | 7/2009 | Ellington | |
| 2009/0185890 | A1 | 7/2009 | Ellington | |
| 2010/0295261 | A1 * | 11/2010 | Ellington | B62B 3/0612 280/43.12 |
| 2011/0171000 | A1 | 7/2011 | Hailston | |
| 2013/0202400 | A1 | 8/2013 | Richard et al. | |
| 2013/0223962 | A1 * | 8/2013 | Ellington | B62B 3/06 414/495 |
| 2015/0203138 | A1 * | 7/2015 | Hassell | B62B 3/04 280/47.34 |
| 2015/0225215 | A1 | 8/2015 | King et al. | |
| 2017/0240194 | A1 | 8/2017 | Kalinowski et al. | |
| 2017/0297881 | A1 | 10/2017 | King et al. | |
| 2017/0341667 | A1 | 11/2017 | Kalinowski et al. | |
| 2018/0057032 | A1 | 3/2018 | Brewer et al. | |

* cited by examiner

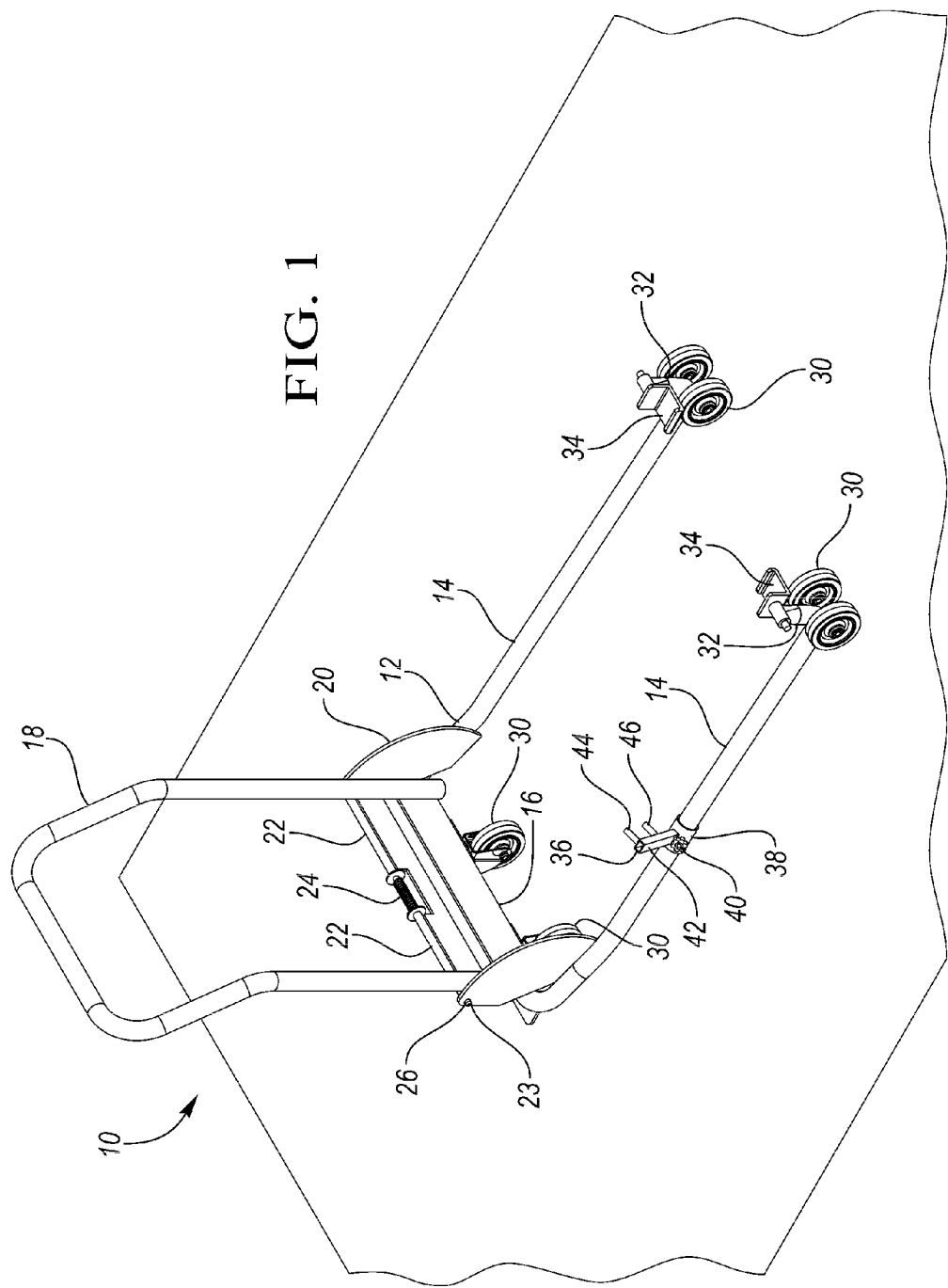

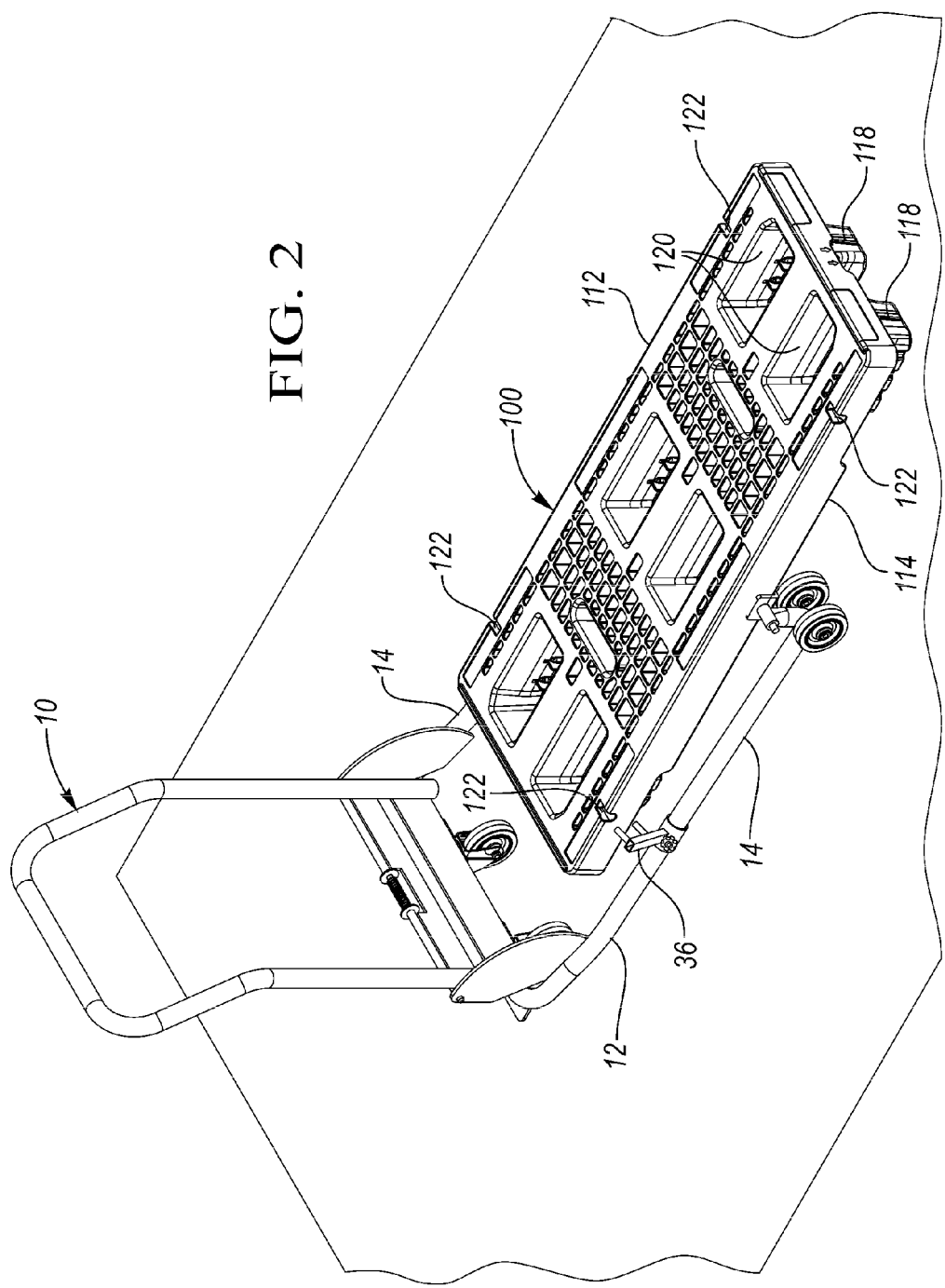

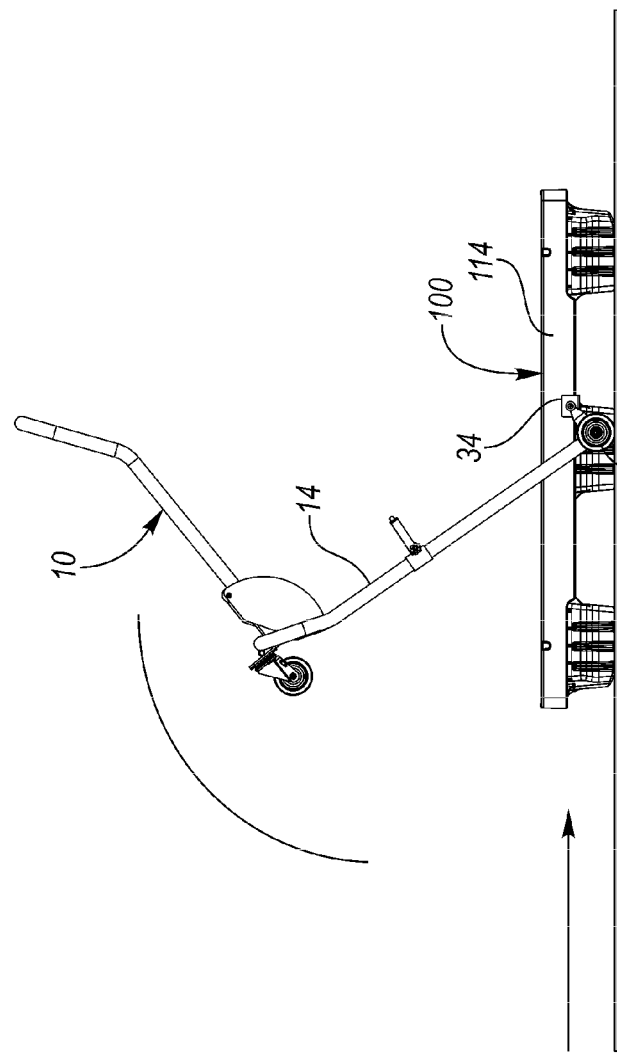
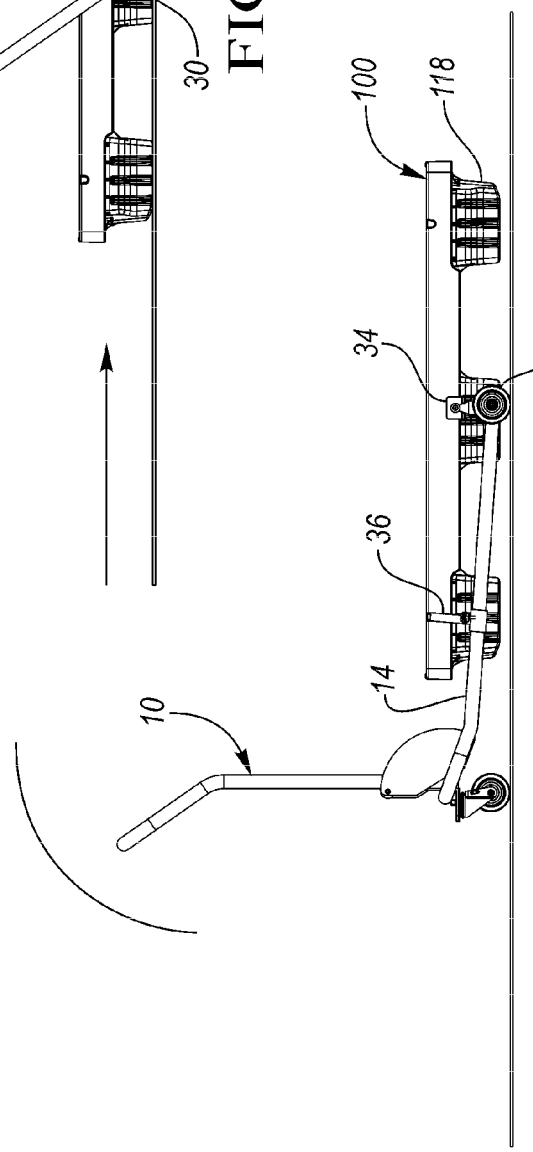

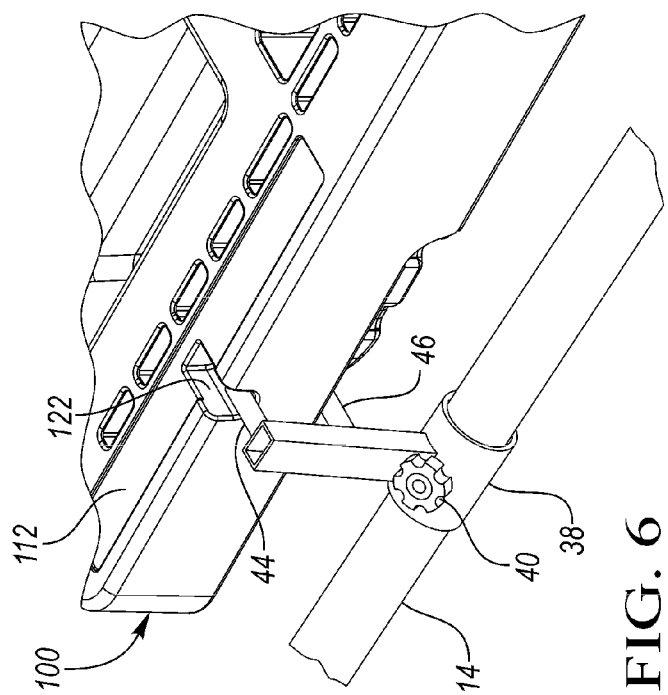
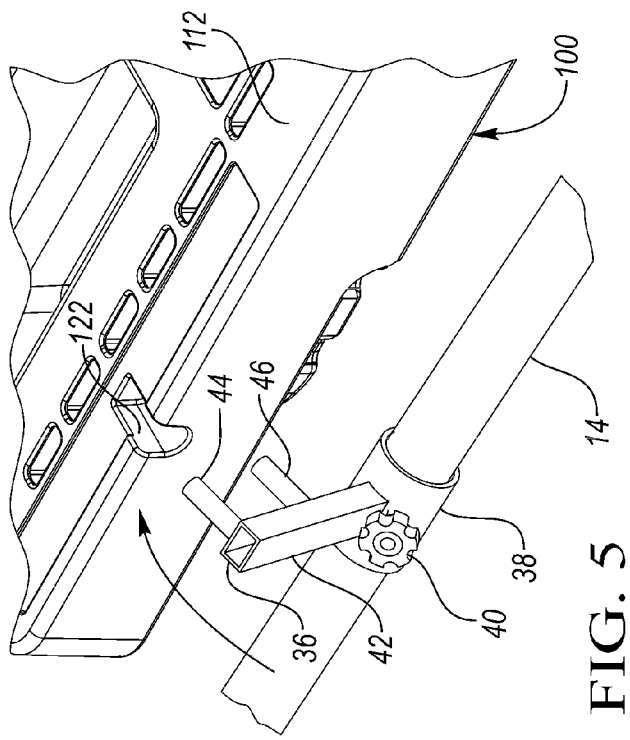
FIG. 5
FIG. 6

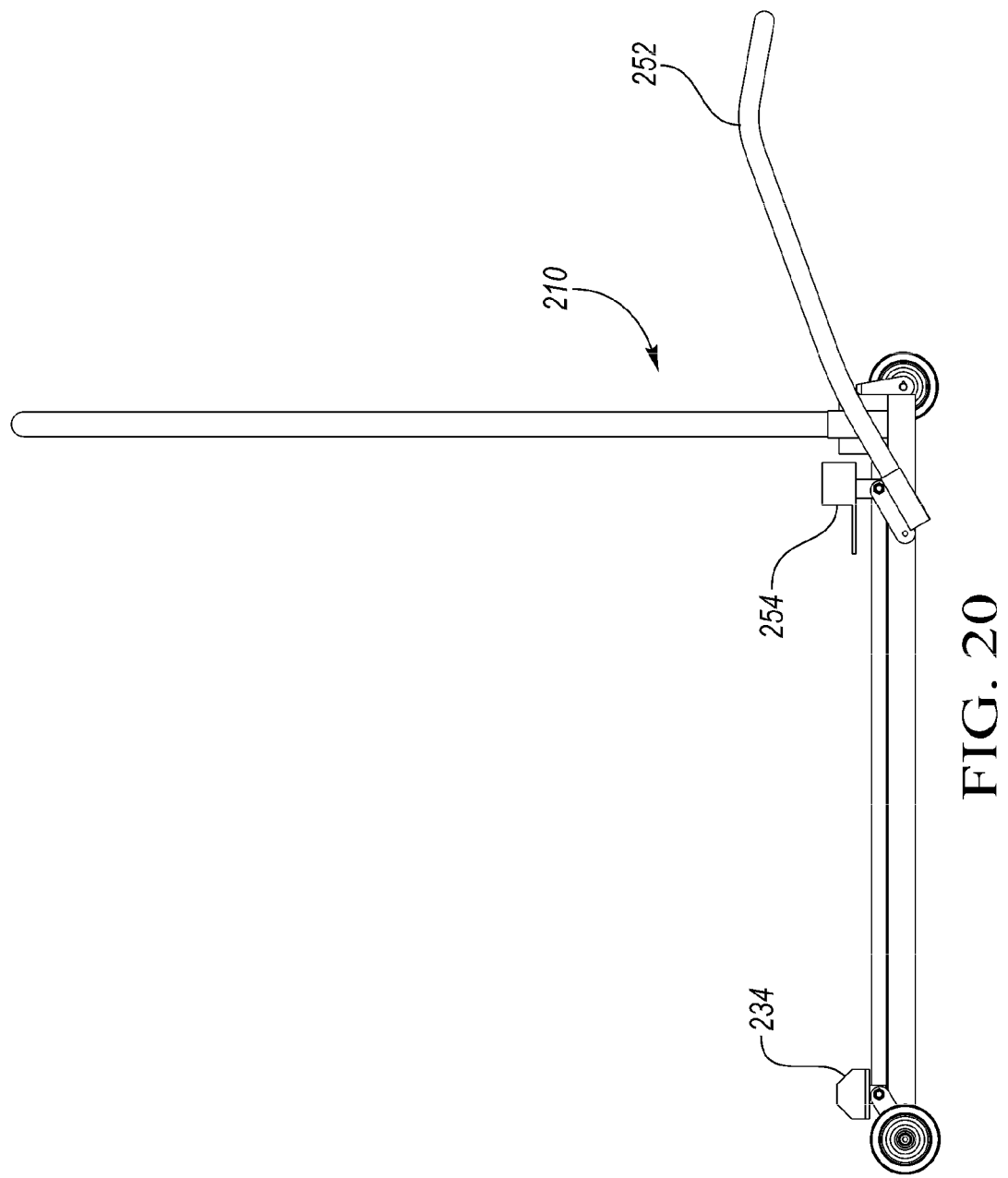

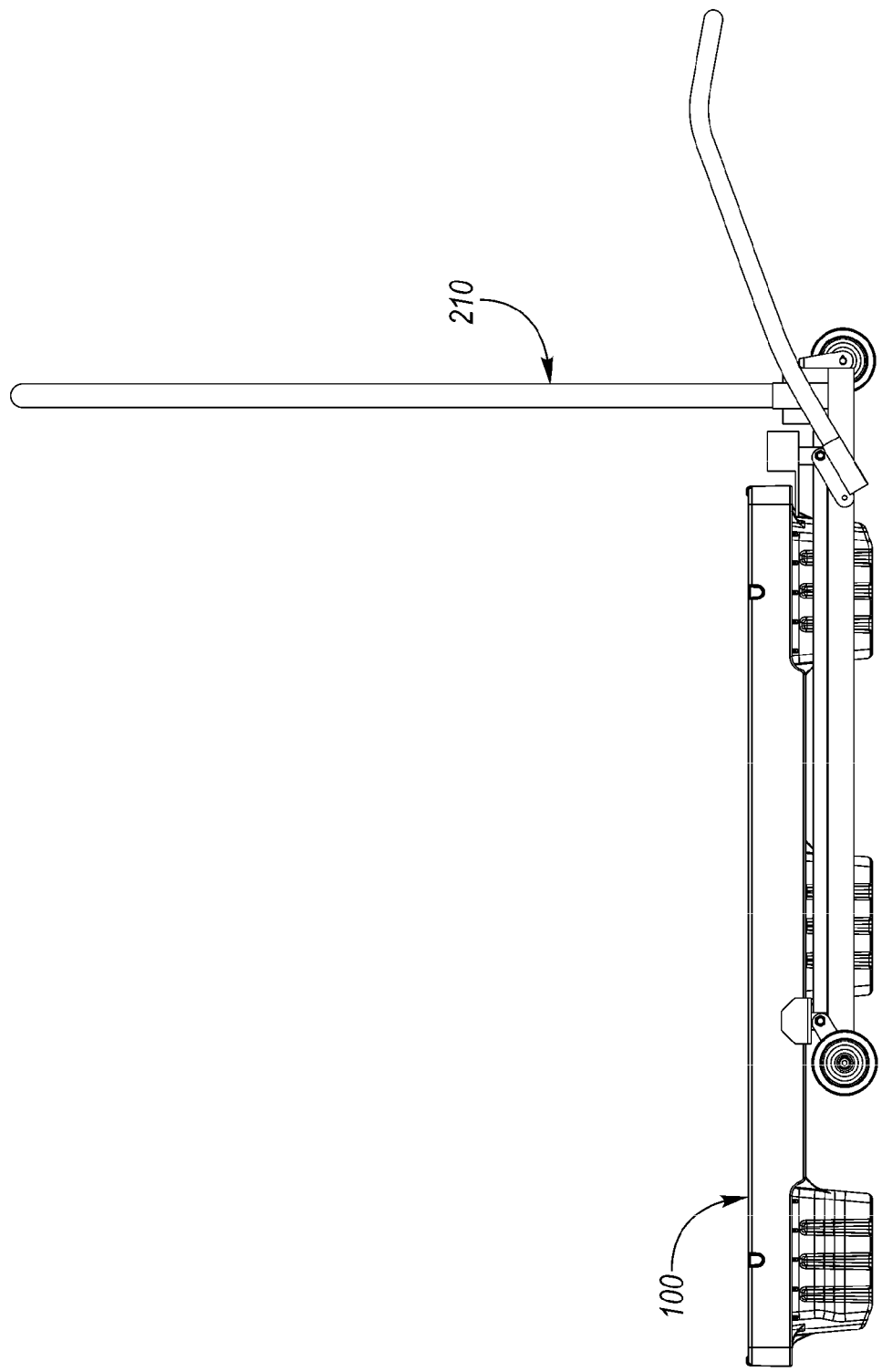

PALLET LIFT

BACKGROUND

Pallets are often used to ship and store goods, such as goods distributed to a grocery store. Pallets typically have a deck supported above the floor by a plurality of columns The pallet may be nestable, in that the columns of one pallet may be received into openings through the deck.

One type of pallet is half the width of standard pallets. As a result, the pallet can be maneuvered out of trucks and into stores more easily. Powered lifts (such as electric or hydraulic) may be used but they are large and bulky.

SUMMARY

A pallet lift includes a base and a plurality of wheels supporting the base. A pair of contact surfaces are proximate a distal end of the base. A handle projects upward proximate a proximal end of the base. A rear support surface support is on the base between the contact surfaces and the handle.

The base may include a pair of spaced apart rails capable of receiving columns of a pallet therebetween. In one embodiment, the base includes a pair of four-bar linkages and the handle is a lift handle configured to selectively collapse and extend the four-bar linkages to raise and lower a pallet.

In another embodiment, the proximal end of the pallet lift may be lifted to lower the contact surfaces under the pallet. By lowering the proximal end of the pallet, the contact surfaces rise under the deck of the pallet and lift the pallet off the floor. The rear support surface may be provided by a locking device having an upper finger and a lower finger pivotable relative to the base to lock the proximal end of the pallet to the pallet lift.

BRIEF DESCRIPTION OF THE DRAWINGS

FIG. 1 is a perspective view of a pallet lift according to a first embodiment.

FIG. 2 shows the pallet of FIG. 1 engaging a pallet.

FIG. 3 show a first step in lifting the pallet of FIG. 2 with the pallet lift of FIG. 2.

FIG. 4 shows a second step in lifting the pallet with the pallet lift.

FIG. 5 is an enlarged view of the locking device in an unlocked position adjacent the pallet.

FIG. 6 shows the locking device of FIG. 5 in a locked position engaged with the pallet.

FIG. 20 is a side view of the pallet lift of FIG. 19.

FIG. 21 shows the pallet lift of FIG. 20 having been positioned to engage a pallet.

DETAILED DESCRIPTION

Figure 7:
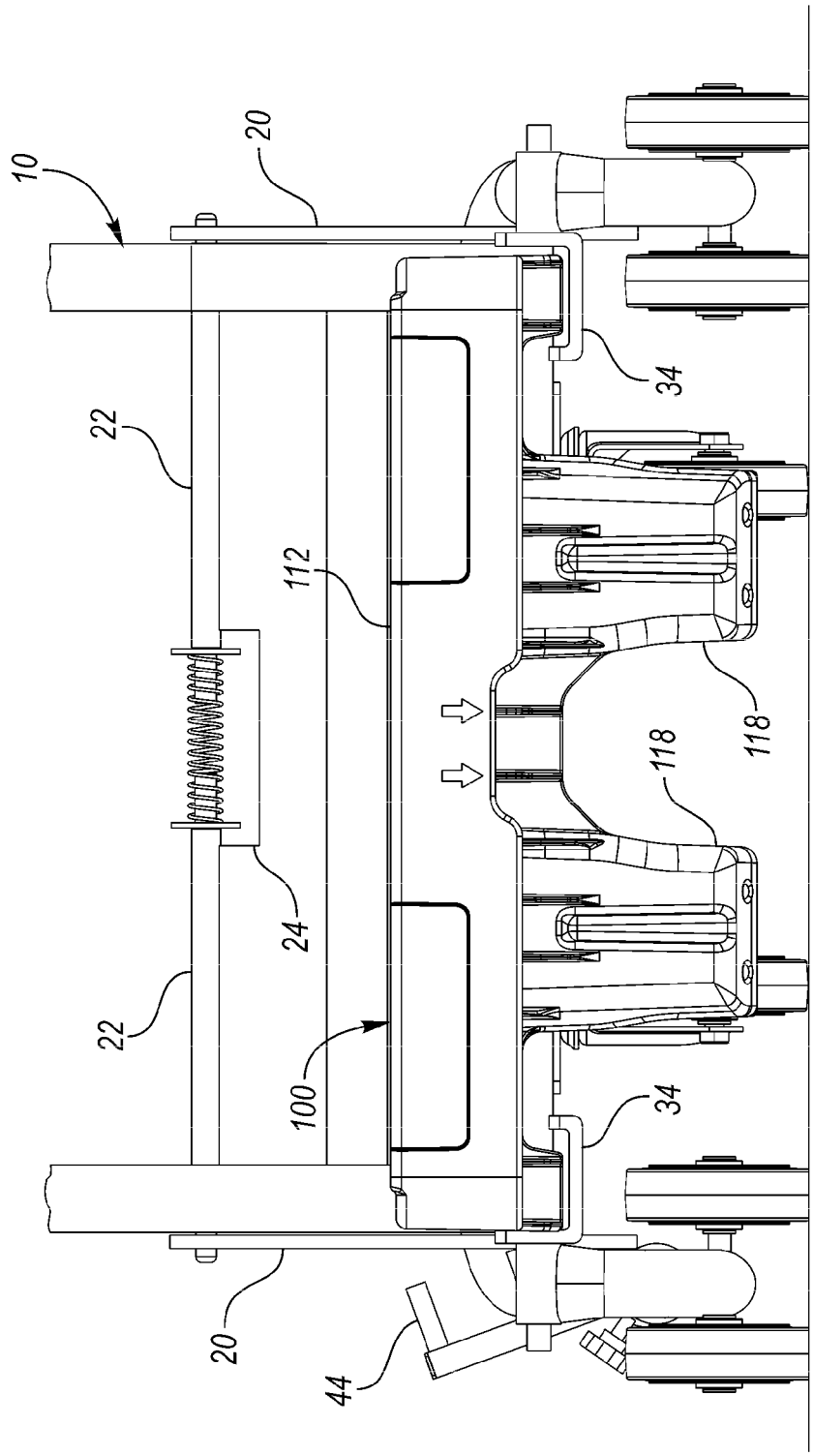
FIG. 7 is an end view of the lift holding the pallet.

A pallet lift 10 according to one embodiment of the present invention is shown in FIG. 1. The pallet lift 10 includes a base 12 having side rails 14, which may be generally parallel to one another and substantially horizontal. The base 12 further includes a rear structure 16 connecting rear ends of the side rails 14. A handle 18 extends upward from the rear structure 16. Side panels 20 extend upward proximate rear ends of the side rails 14 and are selectively connected to the handle 18.

The handle 18 includes locking structure including a pair of sleeves 22 slidably holding a pair of latch pins 23 biased away from one another by a spring 24. The latch pins 23 are selectively connected to apertures 26 in the side panels 20 to retain the handle 18 in an upright position, as shown. Other mechanisms for selectively latching the handle 18 in an upright position could also be used.

A plurality of wheels 30 or casters 30 support the base 12, including wheels 30 at a forward end of the side rails 14. A vertical support 32 extends upward proximate each forward end of the rails 14. A J-shaped cradle 34 is pivotably secured to each of the vertical supports 32 and provides a contact surface for lifting a pallet. The cradles 34 are positioned inward of the rails 14

On at least one of the side rails 14, spaced away from the front end of the rail 14, is mounted an upper locking device 36. The upper locking device 36 includes a collar 38 rotatably fixed to the side rail 14, but lockable in place by a thumbscrew 40. An arm 42 extends upward from the collar 38 and has an upper finger 44 extending laterally therefrom, generally toward the interior of the pallet lift 10. A lower finger 46, spaced below the upper finger 44 and parallel to the upper finger 44, may also extend laterally from the arm 42. The lower finger 46 provides a rear support surface for a pallet, although it will be primarily supported on the cradles 34.

FIG. 2 shows the pallet lift 10 partially engaging a pallet 100. The pallet 100 is preferably a molded plastic pallet 100 including an upper deck 112 for supporting goods thereon. The pallet 100 may be a half-pallet, such as a 48×20 pallet, which is substantially longer than it is wide. Drop rails 114 extend downward from each long side edge of the upper deck 112. Columns 118 extend downward from the upper deck 112 to support the upper deck 112 at a distance above the floor. The columns 118 are spaced away from the peripheral edge of the deck 112. The example pallet 100 is a nestable pallet 100 in that a plurality of large openings are formed in the upper deck 112 to receive the columns 118 of an identical pallet stacked thereon when the pallets 100 are not loaded with goods.

The upper deck 112 includes a plurality of notches 122 formed in upper side edges, and near, but spaced away from each end edge. The notches 122 are spaced such that they can be aligned with the upper locking device 36 of the pallet lift 10.

In use, referring to FIG. 3, the pallet lift 10 is tilted forward (approximately 45 degrees), with the rear of the pallet lift 10 significantly off the floor. The front wheels 30 are rolled to approximately the center (e.g. just past the center). The cradles 34 engage lower edges of the drop rails 114 of the pallet 100.

Referring to FIG. 4, the user then pulls downward on the handle 18 and the rear end of the pallet lift 10. This causes the cradles 34 and wheels 30 to lift the center of the pallet 100 off the floor.

As shown in FIGS. 5 and 6, the upper locking device 36 is rotated inward, thereby locking the near end of the pallet 100 to the pallet lift 10. In particular, the upper finger 44 is received in the notch 122 and the lower finger 46 is received below the upper deck 112. The collar 38 is then locked in place with the thumbscrew 40 to the rail 14.

In this position, the weight of the pallet 100 and any goods stacked thereon bears substantially on the cradles 34 and the upper locking device 36 keeps the pallet 100 balanced on the cradles 34. The pallet 100 can then be moved by rolling the pallet lift 10 by the user. To release the pallet 100, the upper locking device 36 is released and rotated outward, and then the rear end of the pallet lift 10 is lifted (FIG. 3). The pallet lift 10 can then be removed from the pallet 100.

FIG. 7 is an end view of the pallet lift 10 holding the pallet 100. The J-shaped cradles 34 capture the drop rails 114 on each side of the pallet 100 in order to hold the pallet 100 securely. The contact surfaces of the cradles 34 are positioned inward of the rails 14 so that the rails 14 are positioned outward of the deck 114 of the pallet 100, so that they can be tilted (e.g. FIG. 3).

Figure 9:
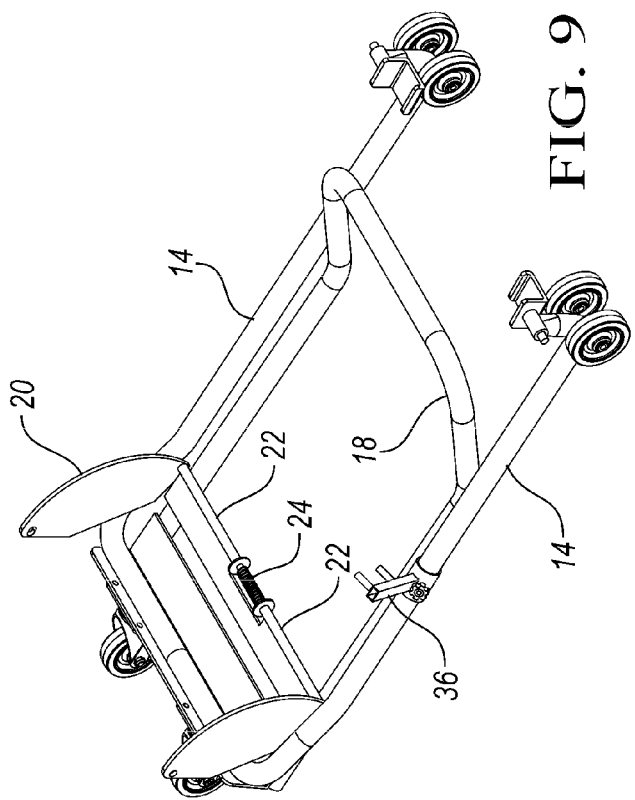
FIG. 9 shows the lift of FIG. 8 with the handle in the collapsed position.
Figure 8:
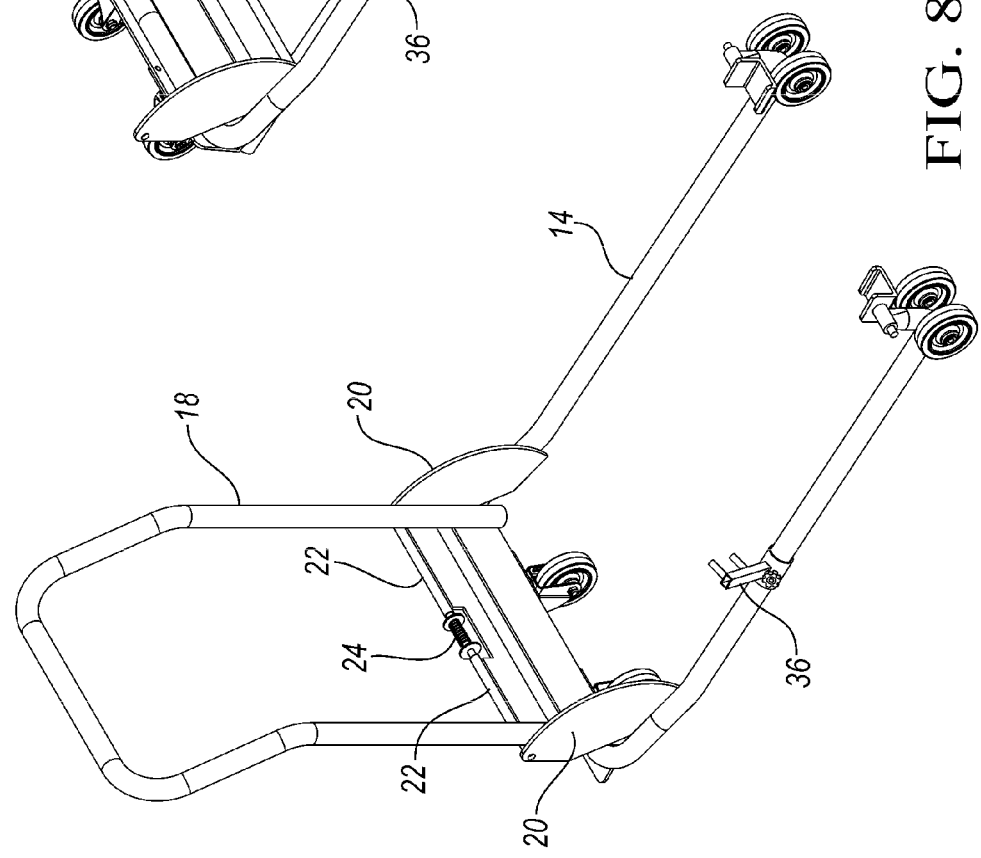
FIG. 8 is a perspective view of the lift with the handle in an upright position.

As shown in FIGS. 8 and 9, the handle 18 can be folded down onto the rails 14 when not in use for easy storage after releasing the latch pins 23. The pins 23 may also be secured to the side panels 20 in the retracted position of FIG. 9. As shown, the handle 18 pivots with the rear structure 16 relative to the side panels 20 and side rails 14.

Figure 10:
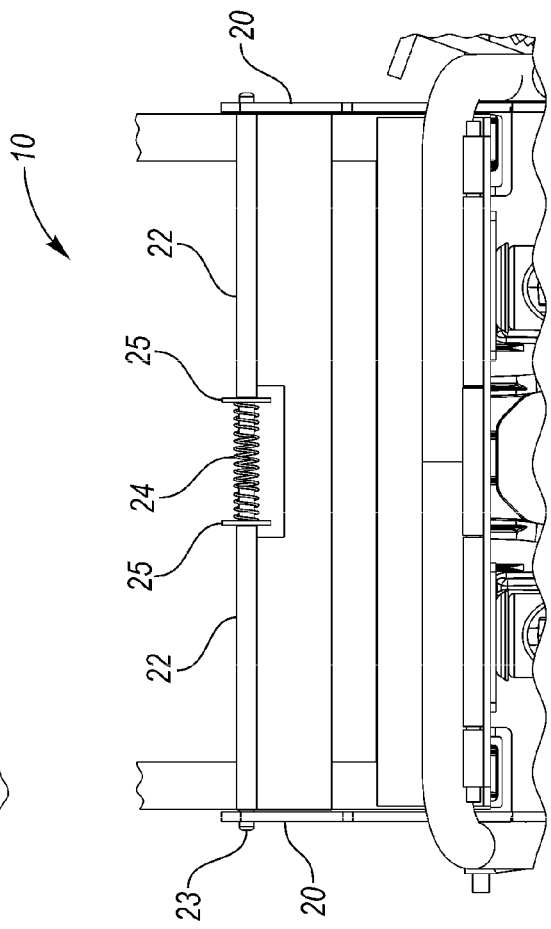
FIG. 10 is a perspective view of the latch for the handle, with the latch in the latched position.
Figure 11:
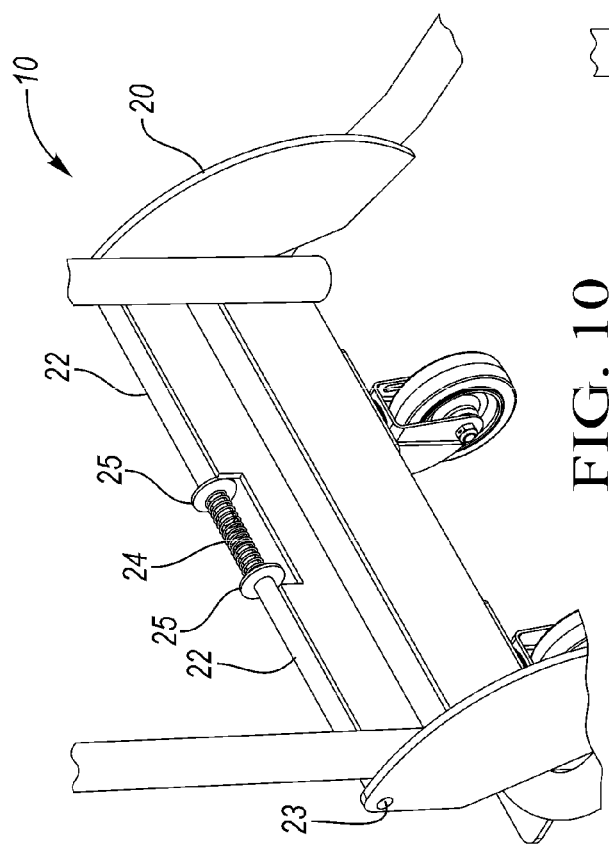
FIG. 11 is an end view of the pallet lift of FIG. 10.

FIGS. 10 and 11 show the latch pins 23, spring 24 and latch flanges 25 in the latched position.

Figure 12:
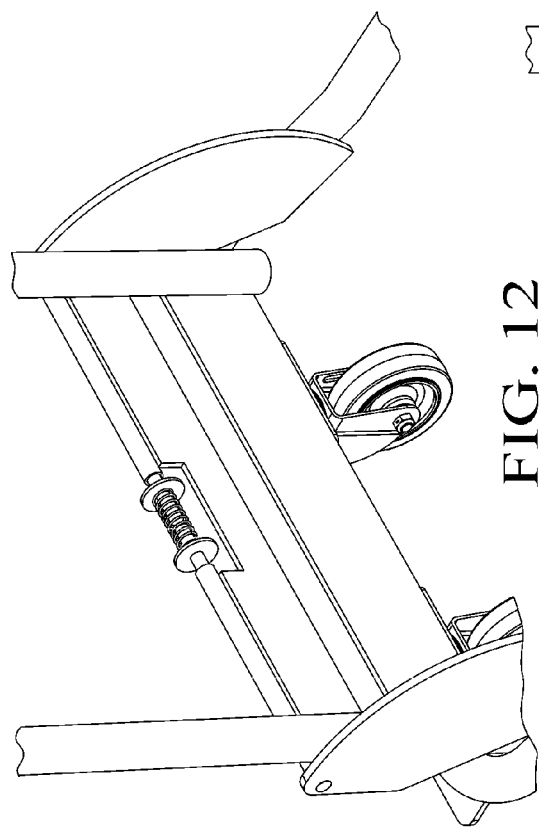
FIG. 12 shows the latch of FIG. 10 in the unlatched position.
Figure 13:
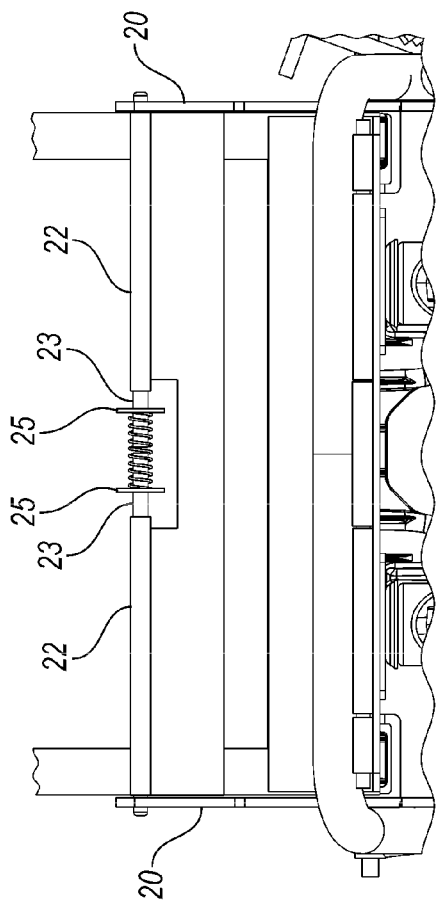
FIG. 13 is an end view of the pallet lift of FIG. 12.

FIGS. 12 and 13 show the latch pins 23, spring 24 and latch flanges 25 in the unlatched position, with the latch flanges 25 squeezed toward one another, thereby drawing the latch pins 23 inward and away from the side panels 20. The flanges 25 are secured to the latch pins 23.

Figure 14:
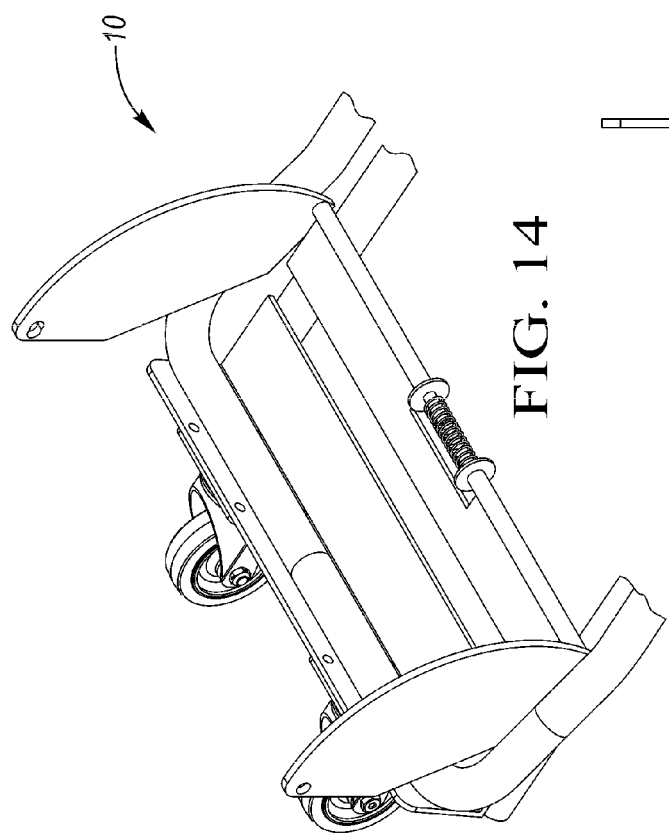
FIG. 14 shows the pallet lift of FIG. 12 with the handle in the collapsed position.
Figure 15:
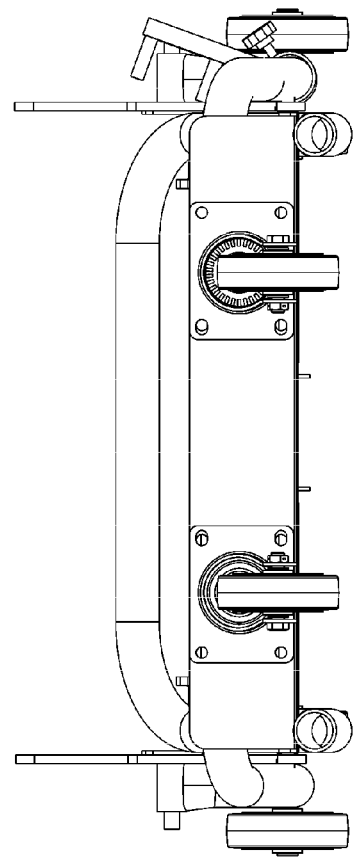
FIG. 15 is an end view of the pallet lift of FIG. 14.

FIGS. 14 and 15 show the handle 18 in the retracted position. FIG. 14 is similar to the view of FIGS. 10 and 12, but with the handle 18 folded downward. Similarly, FIG. 15 is similar to the view of FIGS. 11 and 13, but with the handle 18 folded downward. Note that the rear structure 16 pivots with the handle 18, such that the wheels 30 then project rearwardly from rear structure 16 of the pallet lift 10, but still also protrude downward to support the pallet lift 10 off the floor.

Figure 16:
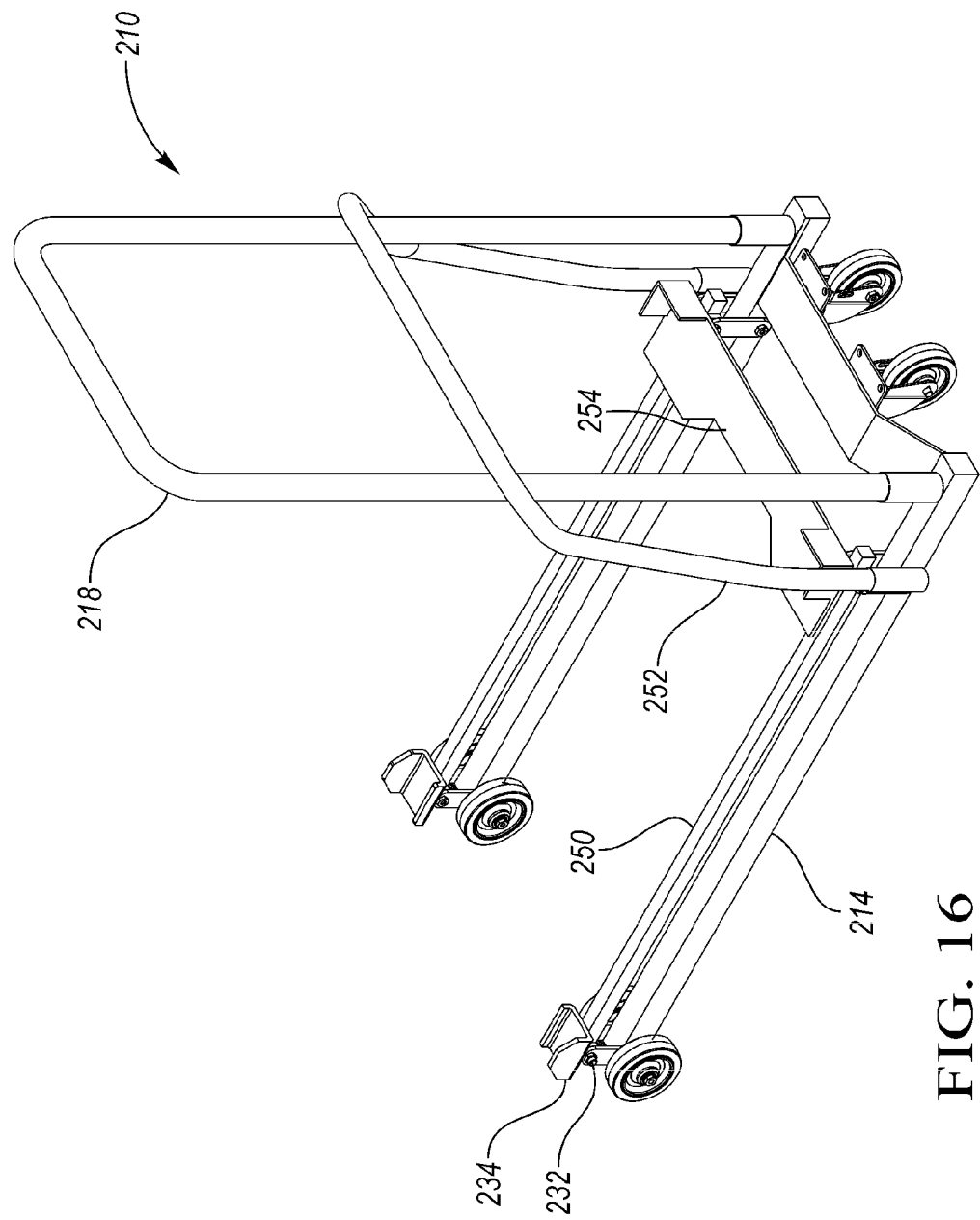
FIG. 16 is a perspective view of a pallet lift according to a second embodiment.

FIG. 16-21 show a pallet lift 210 according to a second embodiment. Referring to FIG. 16, the pallet lift 210 has much of the same structure as the first embodiment. The pallet lift 210 also includes a dedicated lift mechanism for lifting the pallet slightly off the ground so that it can be moved. The cradles 234 are pivotably supported on lift rails 250. The lift rails 250 are pivotably connected to vertical supports 232, which in turn are pivotably connected to the side rails 214. Each lift rail 250 has a front and a rear vertical support 232, thereby creating a four-bar linkage base. Lift rails 250 extend rearward from the cradles 234 to a lift handle 252. Each lift handle 252 is parallel to the front vertical support and each lift handle 252 and has pivot axes coaxial with the pivot axes of the front vertical support 232. The lift handle 252 includes a pair of upright portions connected to one another at upper ends by a horizontal handle portion behind the handle 218 and pivotably secured at lower ends to rearward ends of the side rails 14. A support bracket 254 extends horizontally from one lift rail 250 to the other adjacent the lift handle 252 and provides a rear support surface.

Figure 17:
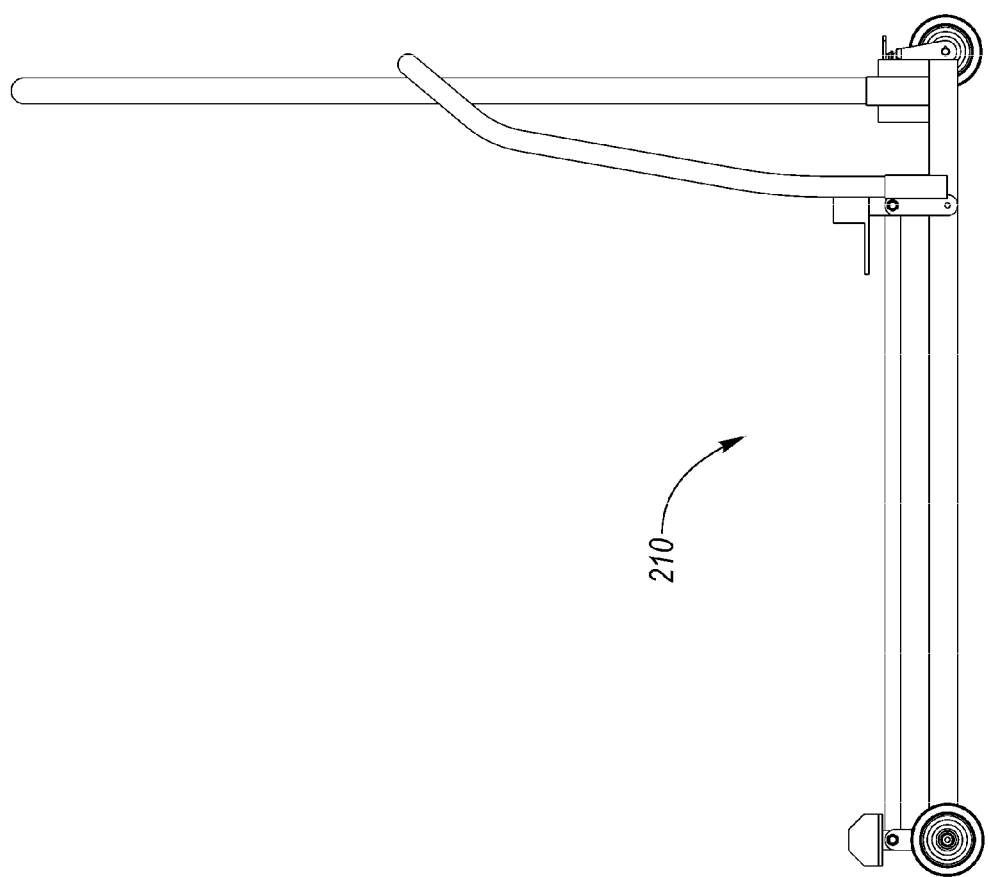
FIG. 17 is a side view of the pallet lift of FIG. 16.

FIG. 17 is a side view of the pallet lift 210. The lift handle 252 provides leverage to operate the lift rail 250 relative to the side rail 214 in the manner of the four-bar linkage. The lift rail 250 stays parallel to the side rail 214 and can be raised or lowered relative to the side rail 214 by pivoting the lift handle 252. The cradles 234 and support bracket 254 raise and lower with the lift rails 250.

Figure 18:
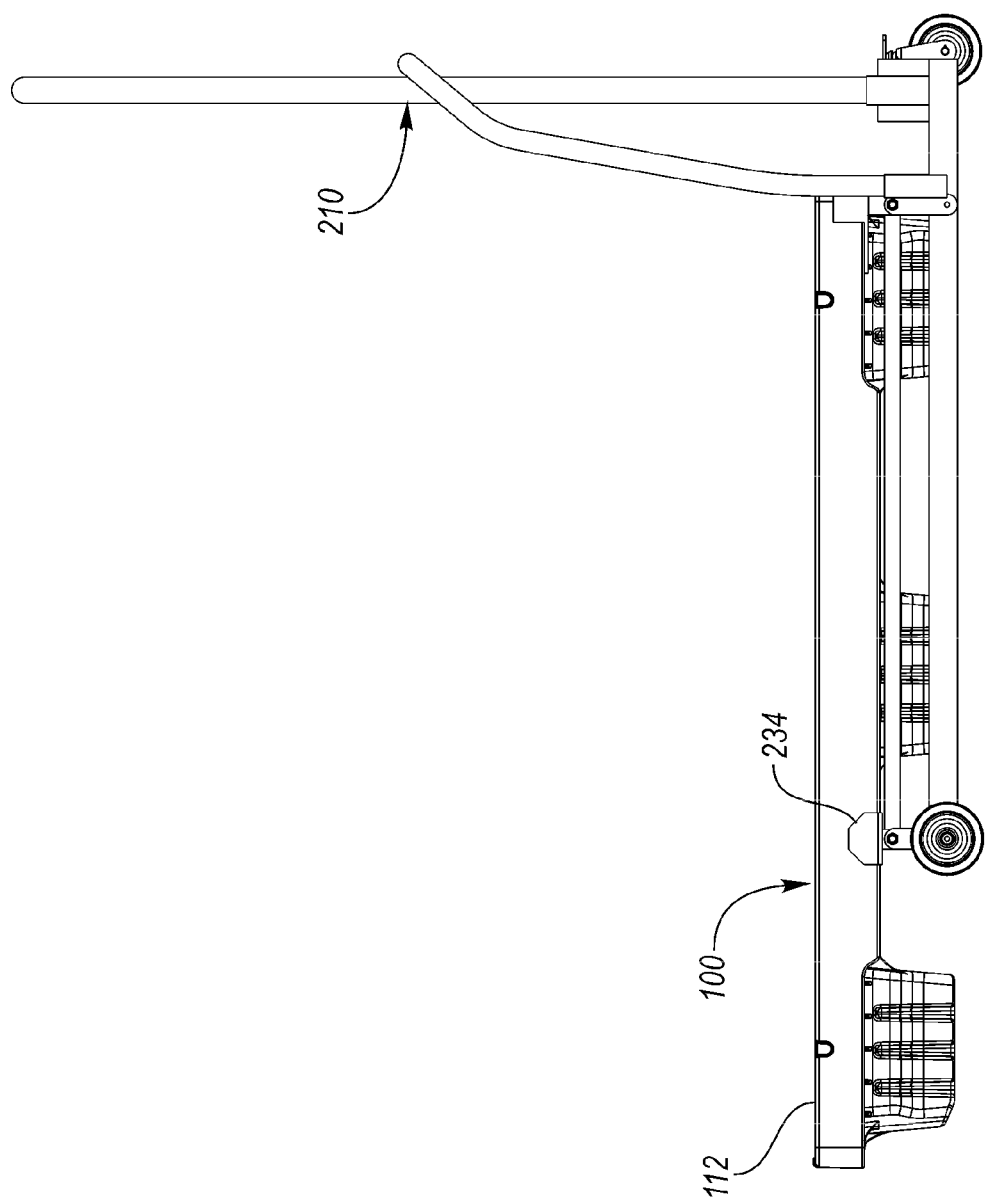
FIG. 18 shows the pallet lift of FIG. 17 with a pallet supported thereon above the floor.

FIG. 18 is a side view of the pallet lift 210 with a pallet 100 on the pallet lift 210 in the lifted position, with some space between the feet of the pallet 100 and the floor so that the pallet lift 210 and pallet 100 (and any load on the pallet 100) can be rolled. The pallet 100 is supported on the cradles 234 and support bracket 254.

Figure 19:
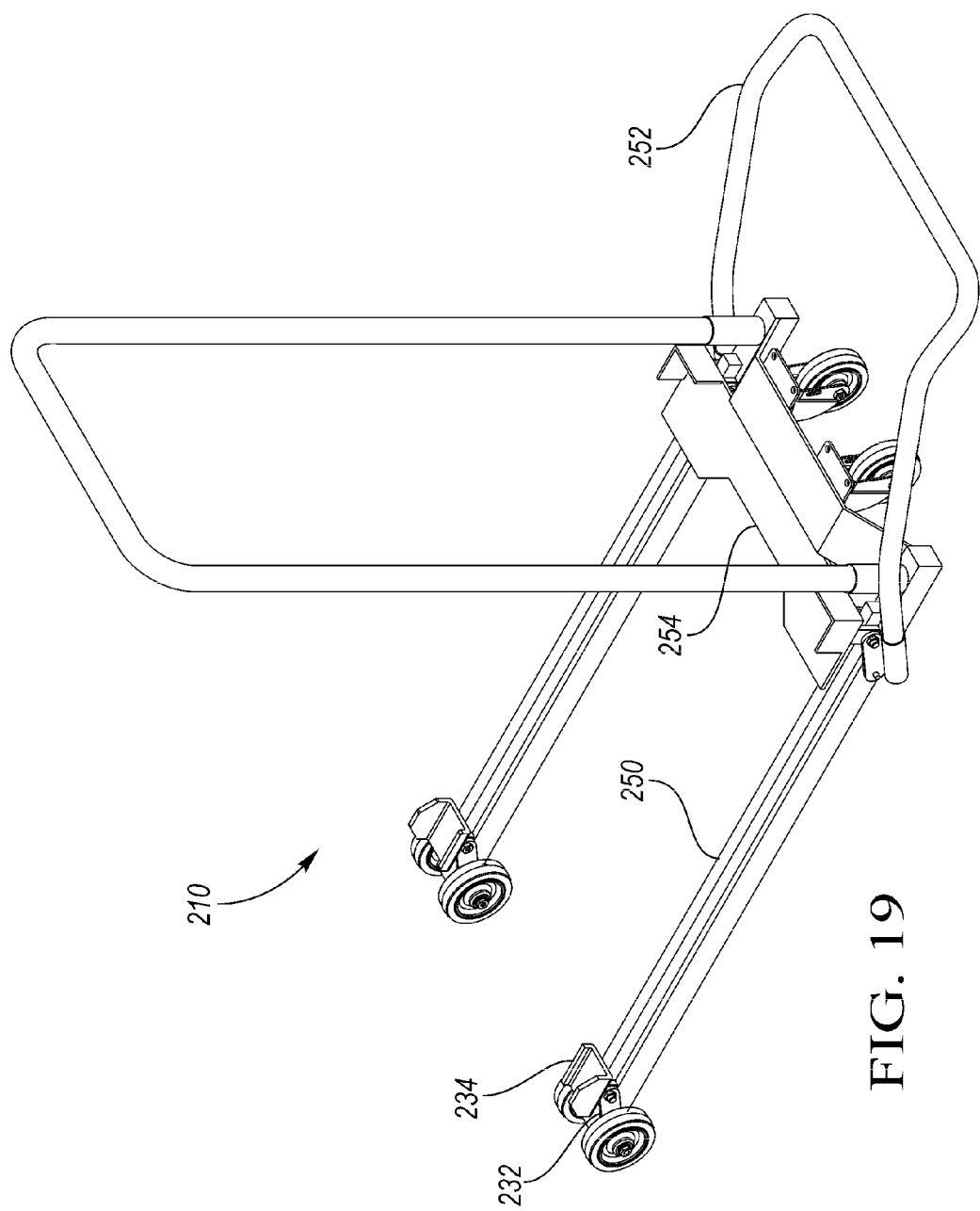
FIG. 19 shows the pallet lift of FIG. 16 with the handle in the lowered position.

FIG. 19 is a perspective view of the pallet lift 210 with the lift handle 252 in the lowered position, i.e. pivoted away from the handle 218. This causes the side rails 252 to pivot rearward and downward on the four-bar linkage, causing the cradles 234 to pivot rearward and downward. The support bracket 254 also moves rearward and downward. FIG. 20 is a side view of the pallet lift 210 in the lowered position, with the lift rails 250 resting on the side rails 252.

FIG. 21 is a side view of the pallet lift 210 of FIG. 19 positioned below the pallet 100. In the lowered position, the pallet lift 210 can be rolled under the pallet 100. The lift handle 252 is then raised, thereby raising the cradles 234 and the support bracket 254 and lifting the pallet 100 (and any goods thereon) off the floor so that it can be moved. A latch mechanism can be used to retain the lift handle 252 and lift rails 250 in the raised, support position.

Note that in the first embodiment (FIGS. 1-15), the pallet 100 is primarily supported by the cradles 34 near the center of the pallet 100, with the locking device 36 mostly maintains balance (so the loaded pallet 100 does not tip forward or rearward). In the second embodiment, the cradles 234 are positioned outward of the center of the pallet 100, so that the weight of the pallet 100 is supported and balanced on the cradles 234 and support bracket 254.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

What is claimed is:

1. A combination including a pallet lift and a pallet, the combination comprising:
   the pallet having a plurality of columns supporting a deck;
   the pallet lift including:
      a base having a proximal end and a distal end, the base including a pair of spaced apart rails capable of receiving columns of the pallet therebetween, wherein the base is open at the distal end to permit receiving the columns of the pallet therebetween;
      a plurality of wheels supporting the base including distal wheels proximate the distal end of the base and proximal wheels proximate the proximal end of the base;
      a pair of contact surfaces proximate the distal end of the base such that the pair of contact surfaces are capable of engaging lower surfaces of the pallet at approximately a center of the pallet, wherein a distance from the pair of contact surfaces to the base is fixed;

a handle projecting upward proximate the proximal end of the base, wherein the handle is fixed against rotation relative to the base; and a rear support surface on the base between the contact surfaces and the handle;

the plurality of columns received between the pair of spaced apart rails, wherein the pallet lift is capable of lifting the pallet off of a floor by rotating the handle relative to the floor while the handle is fixed against rotation relative to the base such that the pair of contact surfaces engage the lower surfaces of the pallet at approximately the center of the pallet.

2. The combination of claim 1 wherein the pair of contact surfaces are formed on cradles spaced above the base.

3. The combination of claim 2 wherein the rear support surface is provided by a locking device having an upper finger and a lower finger pivotable relative to the base.

4. The combination of claim 1 wherein the contact surfaces are over the distal wheels.

5. The combination of claim 3 wherein the locking device is rotatable about an axis parallel to one of the rails to selectively engage and disengage the pallet.

6. A pallet lift comprising:
a base, wherein the base includes a pair of four-bar linkages, wherein each of the four-bar linkages includes a lift rail opposite a side rail, each of the lift rails connected at each end to the corresponding side rail by vertical supports to form a quadrilateral four bar linkage;

a plurality of wheels secured to the side rails, wherein the plurality of wheels and the side rails are fixed relative to one another within the four bar linkage, and wherein the vertical supports pivot relative to the side rails and relative to the plurality of wheels, and wherein the lift rails are movable relative to the side rails and relative to the plurality of wheels;

a pair of contact surfaces proximate a distal end of the base, the contact surfaces fixed relative to the lift rails within the four bar linkage;

a lift handle projecting upward proximate a proximal end of the base, wherein the lift handle is configured to selectively extend and collapse the four-bar linkages to raise and lower a pallet, wherein the four-bar linkages are raised when the lift handle is generally perpendicular to the base and wherein the four-bar linkages are lowered when the lift handle is pivoted downward in a proximal direction, wherein the lift handle extends upward from the lift rails and wherein one of the vertical supports pivots directly with the lift handle; and a rear support surface on the base between the contact surfaces and the lift handle.

7. The pallet lift of claim 6 wherein the plurality of wheels includes distal wheels proximate the distal end of the base and proximal wheels proximate the proximal end of the base.

8. A combination including the pallet lift of claim 7 and the pallet, the pallet having a plurality of columns supporting a deck, the plurality of columns received between the lift rails, wherein the pallet lift is capable of lifting the pallet off of a floor by pivoting the handle relative to the base.

9. The pallet lift of claim 6 wherein the lift handle is a first handle, the pallet lift further including a second handle extending upward from the proximal end of the base and non-rotatable relative to the base.

10. The pallet lift of claim 9 wherein the lift handle includes a pair of upright portions connected to one another at upper ends by a horizontal lift handle portion extending across a proximal side of the second handle.

11. The pallet lift of claim 6 wherein the lift rails are generally parallel to the side rails both when raised and when lowered.

12. The pallet lift of claim 6 wherein the lift rails maintain a generally constant angle relative to the side rails when raised and when lowered.

13. A pallet lift comprising:
a base having a proximal end and a distal end, the base including a pair of spaced apart rails capable of receiving columns of a pallet therebetween, wherein the base is open at the distal end to permit receiving the columns of the pallet therebetween, wherein the base includes a rear structure at the proximal end;

a plurality of wheels supporting the base including distal wheels proximate the distal end of the base and proximal wheels proximate the proximal end of the base, wherein at least one of the proximal wheels is secured to the rear structure;

a pair of contact surfaces proximate the distal end of the base, wherein a distance from the pair of contact surfaces to the base is fixed;

a handle projecting upward proximate the proximal end of the base, the handle connected to the rear structure, the handle and the rear structure selectively lockably fixed against rotation relative to the contact surfaces of the base and selectively pivotable relative to the contact surfaces of the base; and a rear support surface on the base between the contact surfaces and the handle.

14. The pallet lift of claim 13 wherein the spaced apart rails extend forward from the rear structure and are open at the distal end of the base to be capable of receiving four columns of a pallet therebetween.

15. The pallet lift of claim 14 wherein the handle is fixed against rotation relative to the base by a latch, which is releasable to permit the handle to be pivotable relative to the pair of spaced apart rails.

16. In combination, the pallet lift of claim 15 and the pallet, the pallet having a plurality of columns supporting a deck, the columns received between the pair of rails, the deck supported directly on the pair of contact surfaces.

17. A method for lifting a pallet having a plurality of columns supporting a deck, the columns spaced inward from a peripheral edge of the deck, the method including the steps of:

a) pivoting a lift handle of a pallet lift in a first direction relative to the pallet to pivot a four-bar linkage including a pair of side rails, a lift rail, and a pair of supports connecting one of the side rails to the lift rail, further including the step of pivoting the lift handle in the first direction to lower a plurality of contact surfaces relative to the side rails;

b) inserting an end of each of the side rails below the deck and outward of the columns, such that the columns are between the side rails, after said step a);

c) after said step b), pivoting the lift handle in a second direction relative to the pallet to cause the contact surfaces to engage the deck of the pallet outward of the columns and to lift the pallet, wherein said steps a) and c) each include the step of operating the four-bar linkage supporting the contact surfaces, wherein the pallet lift includes a fixed handle fixed relative to the side rails and wherein the lift handle is pivoted away from the fixed handle in said step a) and toward the fixed handle in said step c), wherein the lift handle is secured proximate rearward ends of the side rails and wherein the lift handle is pivoted rearwardly during said step a) and forwardly during said step c).

18. The method of claim 17 wherein the lift handle is pivoted toward a position generally perpendicular to the side rails during said step c).

19. A method for lifting a pallet having a plurality of columns supporting a deck, the columns spaced inward from a peripheral edge of the deck, the method including the steps of:
   a) pivoting a lift handle of a pallet lift in a first direction relative to the pallet to pivot a four-bar linkage including a pair of side rails, a lift rail, and a pair of supports connecting one of the side rails to the lift rail, further including the step of pivoting the lift handle in the first direction to lower a plurality of contact surfaces relative to the side rails;
   b) inserting an end of each of the side rails below the deck and outward of the columns, such that the columns are between the side rails, after said step a);
   c) after said step b), pivoting the lift handle in a second direction relative to the pallet to cause the contact surfaces to engage the deck of the pallet outward of the columns and to lift the pallet,
wherein said steps a) and c) each include the step of operating the four-bar linkage supporting the contact surfaces, wherein the pallet lift includes a fixed handle fixed relative to the side rails and wherein the lift handle is pivoted away from the fixed handle in said step a) and toward the fixed handle in said step c), wherein the lift handle includes a pair of vertical portions each pivotably connected to one of the side rails and a horizontal portion connecting upper portions of the vertical portions to one another, wherein the horizontal portion of the lift handle is adjacent the fixed handle after said step c).

20. A method for lifting a pallet having a plurality of columns supporting a deck, the columns spaced inward from a peripheral edge of the deck, the method including the steps of:
   a) pivoting a lift handle of a pallet lift in a first direction relative to the pallet to pivot a four-bar linkage including a pair of side rails, a lift rail, and a pair of supports connecting one of the side rails to the lift rail, further including the step of pivoting the lift handle in the first direction to lower a plurality of contact surfaces relative to the side rails;
   b) inserting an end of each of the side rails below the deck and outward of the columns, such that the columns are between the side rails, after said step a);
   c) after said step b), pivoting the lift handle in a second direction relative to the pallet to cause the contact surfaces to engage the deck of the pallet outward of the columns and to lift the pallet,
wherein said steps a) and c) each include the step of operating the four-bar linkage supporting the contact surfaces, wherein the pallet lift includes a fixed handle fixed relative to the side rails and wherein the lift handle is pivoted away from the fixed handle in said step a) and toward the fixed handle in said step c), wherein the lift rail is a first lift rail and further including a second lift rail and a support bracket securing one lift rail to the other lift rail, the support bracket engaging and lifting the pallet during step c).

21. A pallet lift comprising:
   a first side rail spaced apart from a second side rail;
   a first lift rail spaced apart from a second lift rail;
   a first pair of vertical supports each pivotably connected to the first side rail and the first lift rail to form a first quadrilateral four-bar linkage;
   a second pair of vertical supports each pivotably connected to the second rail and the second lift rail to form a second quadrilateral four-bar linkage;
   a support bracket connecting a proximal end of the first lift rail to a proximal end of the second lift rail, wherein the support bracket includes a vertical wall portion generally perpendicular to the first lift rail and the second lift rail and projecting upward higher than the first lift rail and the second lift rail;
   a rear bracket connecting a proximal end of the first side rail to a proximal end of the second side rail;
   a distal wheel secured to a distal end of each of the first side rail and the second side rail;
   a pair of proximal wheels secured to the rear bracket;
   a handle pivotably secured to the proximal ends of the first side rail and the second side rail, the handle engaging the first lift rail and the second lift rail such that pivoting the handle relative to the first side rail and the second side rail causes the first lift rail to raise and lower relative to the first side rail and causes the second lift rail to raise and lower relative to the second side rail;
   wherein the pallet lift has an open distal end between distal ends of the first lift rail and the second lift rail and between the distal ends of the first side rail and the second side rail, such that the pallet lift can receive a plurality of columns of a pallet through the open distal end of the pallet lift.

22. In combination, the pallet lift of claim 21 and the pallet, the pallet including the plurality of columns supporting a deck, the plurality of columns received between the first side rail and the second side rail, the deck supported on the first lift rail and the second lift rail.

23. The combination of claim 22 wherein the pallet lift further includes a cradle at each of the distal ends of the first lift rail and the second lift rail.

24. A method for lifting a pallet having a plurality of columns supporting a deck, the plurality of columns spaced inward from a peripheral edge of the deck and supported on a floor, the method including the steps of:
   a) pivoting a lift handle of a pallet lift in a first direction relative to the pallet to pivot a pair of four-bar linkages each including a side rail, a lift rail, and a pair of supports connecting the side rails to the lift rail, further including the step of pivoting the lift handle in the first direction to lower the lift rails relative to the side rails, wherein the lift handle is secured proximate rearward ends of the side rails;
   b) after said step a), rolling the pallet lift forward on the floor toward the pallet so that the plurality of columns of the pallet pass between forward ends of the side rails and between forward ends of the lift rails and so that each of the lift rails is received below the deck and outward of the columns;
   c) after said step b), pivoting the lift handle in a second direction opposite the first direction relative to the pallet to cause the lift rails to engage the deck of the pallet outward of the columns and to lift the pallet and to cause a support bracket connecting rearward ends of the lift rails to engage the deck of the pallet,
wherein the support bracket includes a vertical wall portion generally perpendicular to the lift rails and projecting upward higher than the lift rails, wherein the support bracket further includes a pair of outer walls projecting forward from outer ends of the vertical wall portion outward of the lift rails.

25. The method of claim 24 further including wherein said step a) further includes pivoting the lift handle in the first direction to lower the lift rails relative to the side rails and a rear bracket connecting rearward portions of the side rails.

26. The method of claim 25 wherein the pallet lift further includes a cradle at each of the forward ends the lift rails, step c) further including engaging the deck of the pallet outward of the columns with the cradles.

27. The method of claim 25 wherein said step c) further includes engaging the deck of the pallet with the support bracket.

28. The pallet lift of claim 21 wherein the support bracket further includes a pair of outer walls projecting forward from outer ends of the vertical wall portion outward of the first lift rail and the second lift rail.

\* \* \* \* \*